Aug. 13, 1968  L. J. WINDECKER  3,396,923
STRUCTURE AND METHOD FOR THE FABRICATION THEREOF
Filed Nov. 21, 1966

INVENTOR.
Leo J. Windecker
BY
Robert P. Ingraham
AGENT

United States Patent Office 3,396,923
Patented Aug. 13, 1968

3,396,923
STRUCTURE AND METHOD FOR THE FABRICATION THEREOF
Leo J. Windecker, Midland, Tex., assignor to The Dow Chemical Company, Midland, Mich., a corporation of Delaware
Filed Nov. 21, 1966, Ser. No. 595,933
10 Claims. (Cl. 244—123)

ABSTRACT OF THE DISCLOSURE

Permeable structures are readily prepared by forming a matrix of fiber reinforced resin about a number of contacting expandable synthetic resinous particles or beads and dissolving the beads from the matrix.

---

Figure 1:
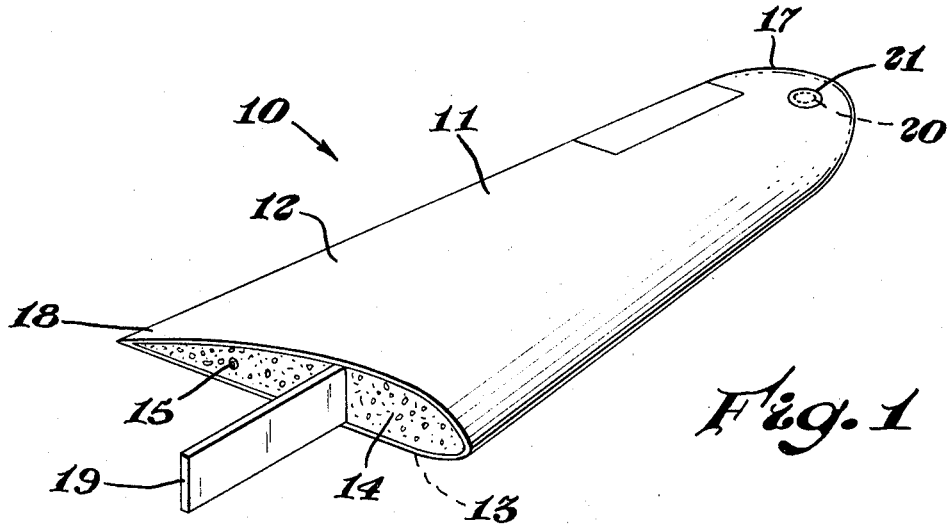

This invention relates to an improved structure and the method for the fabrication thereof and more particularly relates to an improved permeable structure particularly suited for the storage of liquids.

It is frequently desirable to provide hollow or permeable structures particularly adapted and suited to receive liquids. Such structures beneficially may be employed as fuel or liquid storage tanks. Often such structures do not provide significant or substantial physical strength and if relatively large have a tendency to collapse if subjected to external stresses unless significant internal bracing is provided. Usually the fabrication of such tanks or containers is tedious, laborious and expensive. It is desirable in many cases that such a liquid container be an integral and a load bearing part of another structure. Such situation is particularly desirable in the case of aircraft construction wherein fuel is carried in wing tanks. Oftentimes in conventional aircraft construction such tanks are preassembled and merely contained in the wing and supported thereby. Similarly it would be desirable if a boat hull could be adapted to be employed as a fuel tank and also a floation tank without the necessity of fabricating tanks and incorporating them in the hulls.

It is an object of this invention to provide an improved structure of a permeable nature suitable to receive and dispense liquids.

It is also an object of this invention to provide an improved liquid storage structure having high strength.

It is also an object of this invention to provide an improved aircraft wing of high strength and capable of containing and dispensing fuel.

These benefits and other advantages in accordance with the present invention are achieved in a structure, the structure comprising a non-permeable skin, the non-permeable skin forming a closed configuration having first and second opposed sides, a plurality of hardened resin-impregnated filamentary reinforcing elements extending between the first and second opposed sides, and defining a plurality of interconnected voids therein.

Also contemplated within the scope of the present invention is the method for the fabrication of a structure having interconnecting voids therein, the steps of the method comprising admixing the filamentary reinforcing material, a hardenable resin and a plurality of expanded closed cell soluble plastic bodies, the hardenable resin being substantially non-reactive and a non-solvent for the expanded soluble particles, forming the mixture into the compact mass wherein the expanded resinous particles are in adjacent contiguous relationship, causing the hardenable resin to cure or harden, subsequently removing the soluble resinous particles from the structure thereby providing a matrix of hardened resin containing filamentary reinforcing elements, the reinforcing elements and the hardened resin defining a plurality of interconnected voids.

Further features and advantages of the present invention will become more apparent from the following specification taken in connection with the drawing wherein:

In FIGURE 1 there is depicted a wing structure prepared in accordance with the invention.

Figure 2:
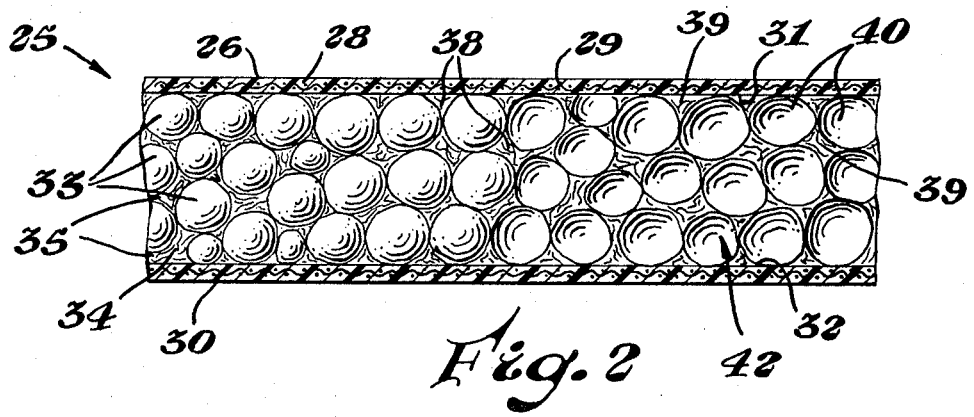

FIGURE 2 is a fractional view of a structure depicting the method of formation of bodies in accordance with the invention.

Figure 3:
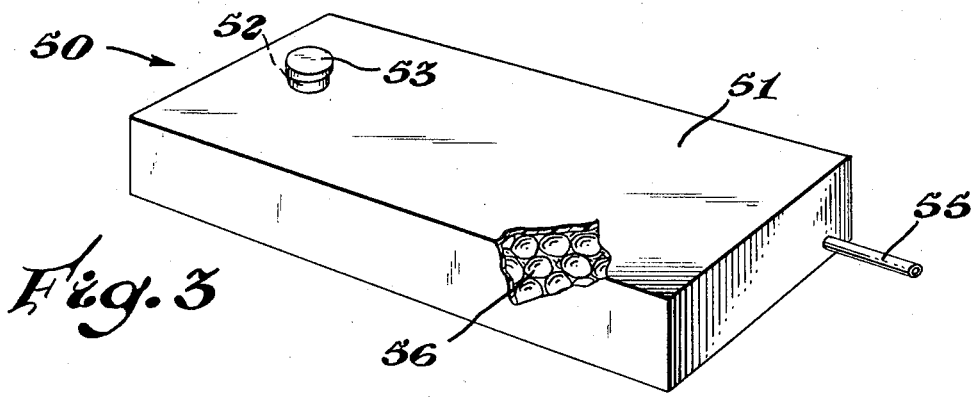

In FIGURE 3 there is shown a fuel tank prepared in accordance with the present invention.

In FIGURE 1 there is depicted a cutaway view of a structure in accordance with the invention generally designated by the reference numeral 10. The structure 10 is an aircraft wing, the wing 10 comprising an impermeable high strength skin 11, the skin 11 defining a generally enclosed configuration and having a first or upper side 12 and a second or under side 13 disposed in generally opposed parallel relationship, the configuration 11 defining therein a space 14, the space 14 containing a plurality of high strength filamentary reinforcing elements 15 extending between the opposed portions of the first side 12 and the second side 13. The reinforcing elements 15 are composed of a high strength filamentary reinforcing material impregnated with a hardened synthetic resin. The wing 10 has a tip 17 and a root 18. A spar 19 extends within the wing 10. An opening 20 is defined in the upper surface 12 of the wing 10 adjacent the tip 17 and is provided with a closure 21. The reinforcements 15 define a plurality of generally spherical interconnected cavities.

In FIGURE 2 there is depicted a structure generally designated by the reference numeral 25. The structure 25 comprises a first impermeable skin 26 composed of a hardened synthetic resin 28 and a filamentary reinforcing material 29 such as glass cloth. A second skin 30 of like construction is remotely disposed and in generally parallel relationship to the skin 28. The skin 26 has an inner surface 31 and the skin 30 has an inner surface 32. Between the surfaces 31 and 32 of the skins 26 and 30 are disposed a plurality of expanded synthetic resinous beads 33. Between the beads 33 are disposed a plurality of high strength reinforcing fibers 34 such as glass fiber. The fibers 34 are contained or encapsulated in a hardened synthetic resinous matrix 35. The beads 33 are in closely adjacent relationship in such a manner that each bead contacts the surface of one or more neighboring beads and the filamentary reinforcing and the hardened resin matrix are disposed in the interstitial spaces between the beads. This region of the structure 25 is generally designated by the reference numeral 38. Adjacent the region 38 is shown a hardened resin impregnated filamentary reinforcing elements 39 extending between the surface 31 and 32 of the skins 26 and 30. The elements 39 define a plurality of generally spherical spaces 40 which are interconnected. This portion of the structure is generally designated by the reference numeral 42. The region 42 is obtained by treating a composite article as shown in the region 38 with a solvent for the expanded beads 33 and dissolving the foamed plastic material therefrom to leave the hardened resinous impregnated reinforcing filaments extending between the skins and a plurality of generally spherical interconnecting cells.

In FIGURE 3 there is depicted a tank in accordance with the invention generally designated by the reference numeral 50. The tank 50 defines an external rigid impervious enclosure 51 having defined therein an opening 52 having a closure 53. A conduit 55 is in operative communication with the interior of the enclosure 51. Within the enclosure 51 are a plurality of reinforcing elements contained in a hardened resin generally designated by the reference numeral 56. The elements 56 define a plurality of generally spherical interconnecting cells such as depicted in the region 42 of FIGURE 2.

Bodies in accordance with the present invention are readily prepared by admixing expanded synthetic resinous beads of a closed cellular nature with a filamentary reinforcing material and a hardenable resin composition which does not chemically react with the expanded thermoplastic beads or have a solvent action thereon. The proportion of filamentary reinforcing material and the hardenable resin is dependent somewhat on the particular geometry of the expandable beads and in general the total volume of the hardenable synthetic resinous material should be slightly less than the interstitial volume of a mass of the expanded beads. The interstitial volume is readily determined by placing a mass of expanded thermoplastic resinous beads such as expanded polystyrene beads, expanded polymethylmethacrylate beads and the like in a container and adding a non-solvent liquid thereto while maintaining the beads in a close engagement with each other. This is readily accomplished by employing a foraminous planar element which fits a container such as a circular screen if a cylindrical vessel is used, adding sufficient non-solvent liquid to reach the level of the screen (with the screen uppermost), then decanting and measuring the volume of liquid. Knowing the total volume that the beads occupied, the void volume is readily calculated. An appropriate amount of filamentary reinforcing and hardenable resin is added. Generally it is desirable to incorporate sufficient hardenable resin to wet the fibers or filaments of the reinforcing elements. The quantity of resin required is generally substantially below the void volume and only in cases where maximum rigidity is required at sacrifice of light weight it is necessary to employ an amount of resin and filamentary reinforcing sufficient to fill the void volume. For most structural purposes a quantity of filamentary reinforcing material from about 20 to 50 percent of the void volume is sufficient, however, if the requirements dictate, particularly as the structure varies, the quantity may be more or less.

By way of further illustration a mass of expanded closed cell polystyrene beads having a bulk density of about 1.7 pounds per cubic foot and bead diameters ranging from about ¼ of an inch to about ½ inch are admixed with a phenol-formaldehyde adhesive then chopped glass roving about 2 inches in length is mixed with the resin wetted beads. The resultant mass is placed in a mold having polytetrafluoroethylene surfaces and molded to form a slab about 2 inches in thickness. A pressure of about 3 pounds per square inch is applied to the mold and the phenol-formaldehyde cured at a temperature of about 65° C. The mold is subsequently opened and a rigid slab is removed which comprises expanded polystyrene beads embedded in a matrix of chopped roving and hardened phenol-formaldehyde resin. Epoxy resin-fiber glass skins having a thickness of about ⅛ of an inch are adhered to the major faces thereof by means of a phenol-formaldehyde adhesive, the adhesive cured and the exposed edge portions of the resultant slab treated with methyl ethyl ketone at room temperature until the polystyrene beads in the slab are dissolved. The laminated slab is provided with epoxy-fiber glass skins on three sides and the void volume determined. Void volume is about 85 percent of the structure formed from the skins alone. The open side of the structure is provided with an epoxy resin-fiber glass skin by means of phenol-formaldehyde adhesive and an opening having a screw closure provided. The resulting container is partially filled with JP 6 jet fuel, then shaking and rocking of the container indicates that adequate baffling is provided to prevent undesired hammer of moving fuel. On opening the container, fuel was discharged at a rate approximately that of a similar container without the resin impregnated filamentary reinforcing. A remaining portion of the slab is soaked in benzene until the polystyrene beads are dissolved, the slab dried and a similar container fabricated. Similar beneficial results are achieved. Both containers are rigid and exhibit little or no tendency to deform when mechanical loads are applied.

An aircraft wing is prepared generally as depicted in FIGURE 1 employing rigid epoxy resin, chopped glass roving and polystyrene beads as a core and packed into a preformed wing comprising a skin of epoxy resin reinforced with glass fiber and having a perforate spar disposed therein in the manner of the spar 19 of FIGURE 1. The wing is maintained within a restraining configuration as the mixture of polystyrene beads, glass and resin are added. The resin is cured at room temperature and subsequently the polystyrene beads are dissolved from the wing employing benzene. A sealing bulkhead of glass fiber and epoxy resin is applied to the root portion of the wing. A structure of more than adequate strength is obtained. An opening and closure such as the opening and closure 20 and 21 are provided adjacent the wing tip and a drainage conduit provided adjacent the lower surface of the wing at the root section. The resultant structure is filled with a JP 6 jet fuel, is leak-proof and provides excellent baffling when a portion of the fuel is removed.

In a manner similar to the foregoing illustration, sandwich boat hulls of high strength are prepared wherein the hull provides the composite function of flotation and serves as a fuel tank. In the fabrication of a boat hull and aircraft wing generally it is often desirable to preform the core of foamed beads, fibers and resin, remove the foamed beads by solvent and apply the skin to the resulting core.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A structure, the structure comprising a non-permeable skin, the non-permeable skin forming a closed configuration having first and second opposed sides, a matrix, the matrix comprising a plurality of hardened resin-impregnated filamentary reinforcing elements extending between the first and second opposed sides, the impregnated filamentary reinforcing elements extending between the first and second opposed sides and having disposed therein a plurality of expanded synthetic resinous beads in closely adjacent relationship in such a manner that each bead contacts one or more neighboring beads.

2. The structure of claim 1 wherein the non-permeable skin is a composite of a hardened resin and a filamentary reinforcing material.

3. The structure of claim 1 wherein the filamentary reinforcing elements are glass fibers.

4. The structure of claim 1 having the configuration of an aircraft wing.

5. The structure of claim 1 including a removable closure and a liquid discharge means in communication with the beads.

6. A method for the fabrication of a structure having interconnecting voids therein, the steps of the method comprising admixing a filamentary reinforcing material, a hardenable resin and a plurality of expanded soluble thermoplastic bodies, the hardenable resin being substantially non-reactive and a non-solvent for the expanded soluble particles, forming the mixture into a compact mass wherein the expanded resinous particles are in adjacent contacting relationship, causing the hardenable resin to cure or harden, subsequently removing the soluble thermoplastic bodies from the structure to provide a matrix of hardened resin containing filamentary reinforcing elements, the reinforcing elements and the hardened resin defining a plurality of interconnected voids.

7. The method of claim 6 wherein the soluble expanded particles are removed by exposure to a solvent for the particles which is a non-solvent for the hardened resin.

8. The method of claim 6 including the step of employing glass fiber as the filamentary reinforcing material.

9. The method of claim 6 including the step of adhering a non-permeable skin to the permeable body.

10. The method of claim 9 including the step of forming the impermeable skin into the configuration of an aircraft wing.

References Cited

UNITED STATES PATENTS

| | | | |
|---|---|---|---|
| 2,602,614 | 7/1952 | Cole | 244—123 |
| 2,985,411 | 5/1961 | Madden | 244—123 |
| 3,146,155 | 8/1964 | Trenner | 161—139 |

MILTON BUCHLER, *Primary Examiner.*

J. PITTENGER, *Assistant Examiner.*